(12) United States Patent
Guo et al.

(10) Patent No.: US 9,325,437 B2
(45) Date of Patent: Apr. 26, 2016

(54) APPARATUS AND METHOD FOR DETECTING SPECTRUM INTERFERENCE

(71) Applicant: ZTE Corporation, Shenzhen, Guangdong (CN)

(72) Inventors: Xiaoyu Guo, Shenzhen (CN); Xuelu Mu, Shenzhen (CN); Dachuan Yi, Shenzhen (CN); Zhiyong Zhao, Shenzhen (CN); Yijun Cui, Shenzhen (CN); Xuede Yu, Shenzhen (CN); Guangguo Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/653,347

(22) PCT Filed: Sep. 9, 2013

(86) PCT No.: PCT/CN2013/083151
§ 371 (c)(1),
(2) Date: Jun. 18, 2015

(87) PCT Pub. No.: WO2014/094460
PCT Pub. Date: Jun. 26, 2014

(65) Prior Publication Data
US 2015/0304056 A1 Oct. 22, 2015

(30) Foreign Application Priority Data

Dec. 18, 2012 (CN) .......................... 2012 1 0548428

(51) Int. Cl.
*H04B 17/345* (2015.01)
*H04L 25/00* (2006.01)
*H04B 1/10* (2006.01)

(52) U.S. Cl.
CPC ............ *H04B 17/345* (2015.01); *H04B 1/1027* (2013.01); *H04L 25/00* (2013.01)

(58) Field of Classification Search
None
See application file for complete search history.

(56) References Cited

U.S. PATENT DOCUMENTS

| 6,304,594 B1 | 10/2001 | Salinger |
| 7,848,741 B2 | 12/2010 | Kivekaes |

(Continued)

FOREIGN PATENT DOCUMENTS

| CN | 101453228 A | 6/2009 |
| CN | 101986573 A | 3/2011 |

(Continued)

OTHER PUBLICATIONS

International Search Report in international application No. PCT/CN2013/083151, mailed on Dec. 19, 2013.

(Continued)

*Primary Examiner* — Alejandro Rivero
(74) *Attorney, Agent, or Firm* — Oppedahl Patent Law Firm LLC

(57) ABSTRACT

An apparatus and a method for detecting spectrum interference. The apparatus includes: a receiving antenna; a normal signal processing unit; an interference signal processing unit; a radio frequency channel processing unit, configured to perform radio frequency processing for a received normal signal, and to perform radio frequency processing for a preprocessed interference signal in an idle timeslot; a radio frequency sampling unit, configured to perform, according to an input sampling clock, radio frequency sampling for the normal signal, for the interference signal, and to send the interference signal to an interference signal detecting unit; and the interference signal detecting unit, configured to perform fast Fourier transform in a digital domain for the interference signal, to perform frequency band identification, and to acquire a communication mode of the interference signal.

12 Claims, 4 Drawing Sheets

(56) References Cited

U.S. PATENT DOCUMENTS

| | | | |
|---|---|---|---|
| 8,655,300 B2 * | 2/2014 | Kapoor | H04B 1/1036 375/350 |
| 2005/0159109 A1 | 7/2005 | Kivekas | |
| 2010/0014616 A1 * | 1/2010 | Coulson | H04B 1/1027 375/341 |
| 2013/0115904 A1 * | 5/2013 | Kapoor | H04B 1/1036 455/234.1 |

FOREIGN PATENT DOCUMENTS

| | | |
|---|---|---|
| CN | 102186202 A | 9/2011 |
| CN | 202261303 U | 5/2012 |
| EP | 1551199 A2 | 7/2005 |
| EP | 2408117 A1 | 1/2012 |
| EP | 2635086 A1 | 9/2013 |

OTHER PUBLICATIONS

English Translation of the Written Opinion of the International Search Authority in international application No. PCT/CN2013/083151, mailed on Dec. 19, 2013.

Supplementary European Search Report in European application No. 13865370.4, mailed on Oct. 30, 2015.

* cited by examiner

Primary receiving channel (Prior Art)

APPARATUS AND METHOD FOR DETECTING SPECTRUM INTERFERENCE

TECHNICAL FIELD

The disclosure relates to the field of mobile communications, and more particularly to an apparatus and a method for detecting spectrum interference.

BACKGROUND

With continuous development of communication technologies, at present, several different communication modes are generally employed in various countries to collaboratively construct networking. To facilitate networking and installation and save cost, demands on wireless broadband base stations simultaneously applicable to different communication modes are increasing. However, since the receiving and processing bandwidth of the wireless broadband base station is too much high, it is easily subject to spatial interference. In practical use, it is better to collect and analyze various wireless spectrum signals in the space, to better plan the frequency. Therefore, an apparatus and a method for detecting spectrum interference for use in a wireless broadband base station is urgently desired at present, which can extract, analyze and process various interference signals received in a space, thereby to determine such information as frequency and amplitude of the interference signals, detailed cell, and the like.

FIG. 1 is a schematic diagram of an apparatus for detecting spectrum interference used by a traditional base station in the related art. FIG. 2 is a flowchart of interference signal detection of the traditional base station in the related art. As illustrated in FIG. 1 and FIG. 2, in the related art, a method for detecting an interference signal applicable to a traditional wireless base station is as follows.

Reception and analyzing can be performed by using an existing base station receiving channel, and the interference signals within the receiving frequency band or a portion of the interference signals within the receiving frequency band are received. The interference signals pass through a duplexer 109, a low-noise amplifier 110, and a radio frequency channel processing unit 111, enter a frequency mixer, and then enter an analog-to-digital converter (ADC) 113 through a medium frequency filter and a medium frequency processing unit 112. Information such as forming filter coefficients, bandwidths, and central frequency points corresponding to different interference signals is prestored in a base station. When interference medium frequency signals are frequency-converted into baseband signals, parameters such as forming filter existent in the base station are selected and a suitable central frequency point is selected to perform a down-conversion operation. Then baseband signals corresponding to different interference signals are obtained, and then the obtained baseband signals are analyzed.

The method for detecting the interference signal applicable to the traditional wireless base station has the following disadvantages:

1: The receiving antenna and the normal receiving channel of the base station are directly used.

2: The above method is capable of only detecting interference signals within the receiving frequency band of the base station or a portion of the interference signals within the receiving frequency band, but is not capable of receiving and detecting the interference signals out of the receiving frequency band.

3: Directed to the circumstance where the surrounding interference signals are known, according to the above method, information such as different forming filters is prestored in the base station, whereas no solution is provided for addressing the surrounding unknown interference signal.

SUMMARY

Embodiments of the disclosure provide an apparatus and a method for detecting spectrum interference, so as to solve the problem that unknown interference signals around a wireless broadband base station fail to be detected in the related art.

An embodiment of the disclosure provides an apparatus for detecting spectrum interference. The apparatus includes:

a receiving antenna, configured to receive a spatial signal, wherein the spatial signal includes a normal signal and an interference signal;

a normal signal processing unit, configured to perform wave filtering and low-noise amplification for the normal signal received by the receiving antenna, and to send the processed normal signal to a radio frequency channel processing unit;

an interference signal processing unit, configured to preprocess the interference signal received by the receiving antenna, and to send the preprocessed interference signal to the radio frequency channel processing unit;

the radio frequency channel processing unit, configured to perform radio frequency processing for the received normal signal, and to perform radio frequency processing for the preprocessed interference signal in an idle timeslot;

a radio frequency sampling unit, configured to perform, according to an input sampling clock, radio frequency sampling for the normal signal performed the radio frequency processing, to perform radio frequency sampling for the interference signal performed the radio frequency processing in an idle timeslot, and to send the interference signal performed the radio frequency sampling to an interference signal detecting unit; and the interference signal detecting unit, configured to perform fast Fourier transform in a digital domain for the interference signal performed the radio frequency sampling, to perform frequency band identification, and to acquire a communication mode of the interference signal.

Preferably, the receiving antenna may be a receiving antenna of a base station connected to the normal signal processing unit and the interference signal processing unit; or the receiving antenna may include an auxiliary detecting antenna connected to the interference signal processing unit, and a receiving antenna of a base station connected to the normal signal processing unit.

Preferably, the normal signal processing unit may include:

a duplex filter, configured to perform duplex filtering for the normal signal; and a low-noise amplifier, configured to perform low-noise amplification for the normal signal performed the duplex filtering, and to send the normal signal performed the low-noise amplification to the radio frequency channel processing unit.

Preferably, the interference signal processing unit may include:

a broadband coupler, configured to perform power coupling for the interference signal;

an envelope detector, configured to perform amplitude detection for the interference signal performed the coupling, and to acquire an amplitude of the interference signal;

a comparator, configured to: compare the amplitude of the interference signal with a preset amplitude threshold; if the amplitude of the interference signal is greater than the preset amplitude threshold, to enable the interference signal to pass through an amplitude limiter by using a control switch; and if the amplitude of the interference signal is less than the preset amplitude threshold, to enable the interference signal to directly flow into the radio frequency channel processing unit by using the control switch; and the amplitude limiter, configured to perform amplitude limiting for the interference signal flowing into the radio frequency channel processing unit, and to send the interference signal performed the amplitude limiting to the radio frequency channel processing unit.

Preferably, the interference signal detecting unit may include:

a frequency band identifying module, configured to perform fast Fourier transform in a digital domain for the interference signal performed the radio frequency sampling, and to perform frequency band identification according to a location and a bandwidth of the interference signal in a frequency domain; and a communication mode identifying module, configured to enable, after the frequency band identifying module performs the fast Fourier transform in the digital domain for the interference signal, the interference signal in a time domain to sequentially pass through digital filters in various communication modes, and to determine a communication mode of the interference signal according to information of a maximum amplitude in the digital filters in various communication modes.

Preferably, the interference signal detecting unit may further include:

a cell information identifying module, configured to demodulate the interference signal in a time domain to zero frequency, to use a peculiar fixed signal sequence in a mode signal corresponding to communication mode of the interference signal in a baseband, to perform related calculation with the interference signal, and to acquire related cell information of the interference signal.

An embodiment of the disclosure provides a method for detecting spectrum interference. The method includes:

performing, by a normal signal processing unit, wave filtering and low-noise amplification for a normal signal received by a receiving antenna, and sending the processed normal signal to a radio frequency channel processing unit;

preprocessing, by an interference signal processing unit, an interference signal received by the receiving antenna, and sending the processed interference signal to the radio frequency channel processing unit;

performing, by the radio frequency channel processing unit, radio frequency processing for the received normal signal, and performing radio frequency processing for the preprocessed interference signal in an idle timeslot;

performing, by a radio frequency sampling unit according to an input sampling clock, radio frequency sampling for the normal signal performed the radio frequency processing, performing radio frequency sampling for the interference signal performed the radio frequency processing in an idle timeslot, and sending the interference signal performed the radio frequency sampling to an interference signal detecting unit; and performing, by the interference signal detecting unit, fast Fourier transform in a digital domain for the interference signal performed the radio frequency sampling, performing frequency band identification, and acquiring a communication mode of the interference signal.

Preferably, the receiving antenna may be a receiving antenna of a base station connected to the normal signal processing unit and the interference signal processing unit; or the receiving antenna may include an auxiliary detecting antenna connected to the interference signal processing unit, and a receiving antenna of a base station connected to the normal signal processing unit.

Preferably, the performing, by a normal signal processing unit, wave filtering and low-noise amplification for a normal signal received by a receiving antenna, and sending the processed normal signal to a radio frequency channel processing unit may include:

performing duplex filtering, by a duplex filter in the normal signal processing unit, for the normal signal; and performing, by a low-noise amplifier in the normal signal processing unit, low-noise amplification for the normal signal performed the duplex filtering, and sending the normal signal performed the low-noise amplification to the radio frequency channel processing unit.

Preferably, the preprocessing, by an interference signal processing unit, an interference signal received by the receiving antenna, and sending the processed interference signal to the radio frequency channel processing unit may include:

performing, by a broadband coupler in the interference signal processing unit, coupling for the interference signal;

performing, by an envelope detector in the interference signal processing unit, detection for the interference signal performed the coupling, and acquiring an amplitude of the interference signal;

comparing, by a comparator in the interference signal processing unit, the amplitude of the interference signal with a preset amplitude threshold; if the amplitude of the interference signals is greater than the preset amplitude threshold, enabling the interference signal to pass through an amplitude limiter by using a control switch; and if the amplitude of the interference signals is less than the preset amplitude threshold, enabling the interference signal to directly flow into the radio frequency channel processing unit by using the control switch; and performing, by the amplitude limiter in the interference signal processing unit, amplitude limiting for the interference signal flowing into the radio frequency channel processing unit, and sending the interference signals performed the amplitude limiting to the radio frequency channel processing unit.

Preferably, the performing, by the interference signal detecting unit, fast Fourier transform in a digital domain for the interference signal performed the radio frequency sampling, perform frequency band identification, and acquiring a communication mode of the interference signal may include:

performing, by a frequency band identifying module in the interference signal detecting unit, fast Fourier transform in a digital domain for the interference signal performed the radio frequency sampling, performing frequency band identification according to a location and a bandwidth of the interference signal in a frequency domain; and enabling, by a communication mode identifying module in the interference signal detecting unit, after the frequency band identifying module performs the fast Fourier transform in the digital domain for the interference signal, the interference signal in a time domain to sequentially pass through digital filters in various communication modes, and determining a communication mode of the interference signal according to information of a maximum amplitude of the digital filters in various communication modes.

Preferably, the method may further include:

demodulating, by a cell information identifying module in the interference signal detecting unit, the interference signal in a time domain to zero frequency, using a peculiar fixed signal sequence in a mode signal corresponding to the communication mode of the interference signal in a baseband, performing related calculation with the interference signal, and acquiring related cell information of the interference signal.

Embodiments of the disclosure achieve the following beneficial effects:

The detecting apparatus designed by using the detecting antenna or the receiving antenna of the base station and by reusing the existing receiving channel is capable of simultaneously receiving more unknown wireless interference signals for analyzing and processing. This does not influence normal operation of receiving and sending information of the base station, and saves the cost. In addition, with the technical solutions according to the embodiments of the disclosure, such information as the frequency, amplitude, communication mode, and cell of the interference signals may be detected, such that the wireless broadband base station better implementing work such as frequency planning.

BRIEF DESCRIPTION OF THE DRAWINGS

In the drawings, like reference numerals denote like parts. In the drawings.

DETAILED DESCRIPTION

To solve the problem that the problem that unknown interference signals around a wireless broadband base station fail to be detected in the related art, the disclosure provides an apparatus and a method for detecting spectrum interference. The disclosure is further described in detail with reference to the drawings and embodiments. It shall be understood that the specific embodiments described herein are only for illustrating the disclosure, but are not intended to limit the disclosure.

Apparatus Embodiment

Figure 1:
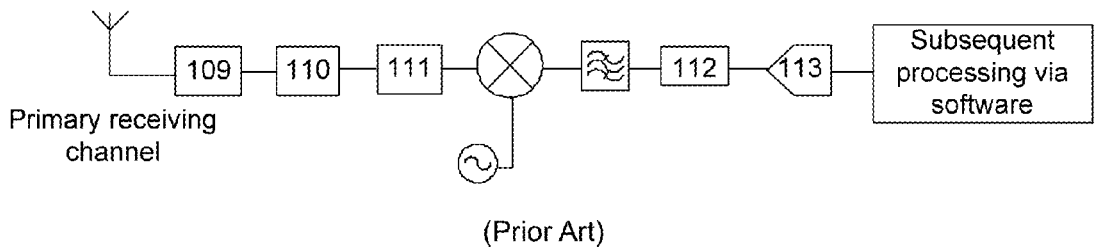
FIG. 1 is a schematic diagram of an apparatus for detecting spectrum interference used by a traditional base station in the related art.
Figure 2:
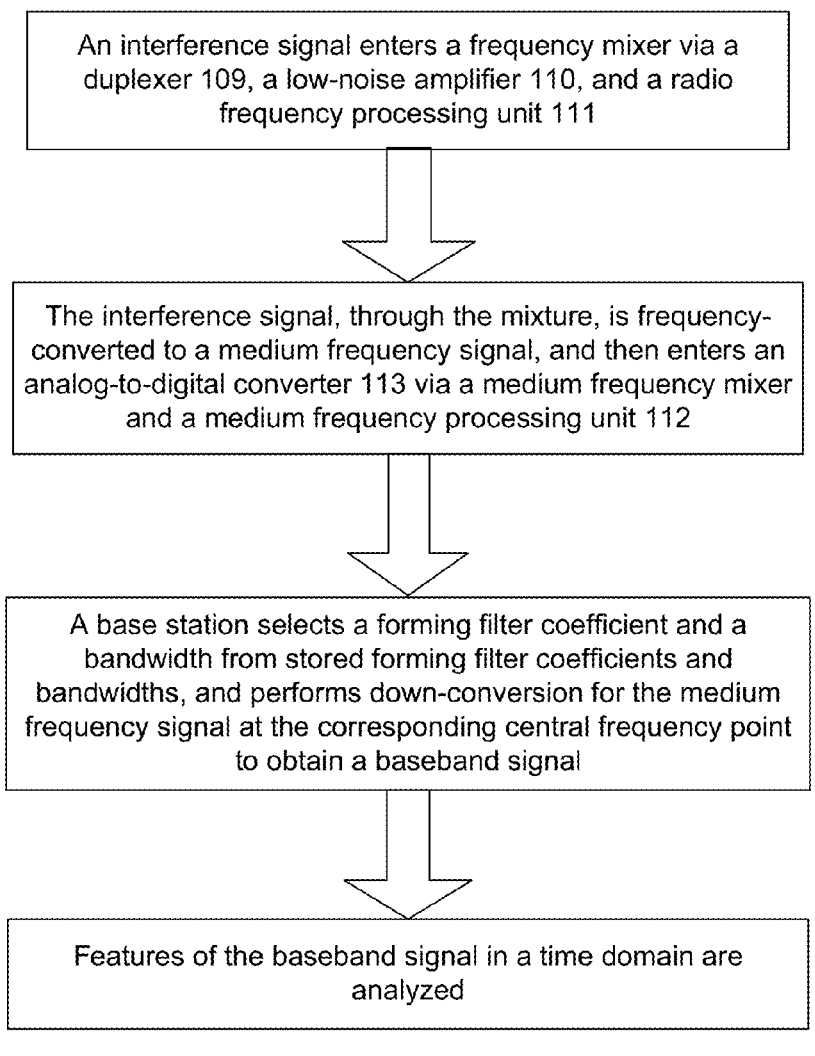
FIG. 2 is a flowchart of interference signal detection of the traditional base station in the related art.
Figure 3:
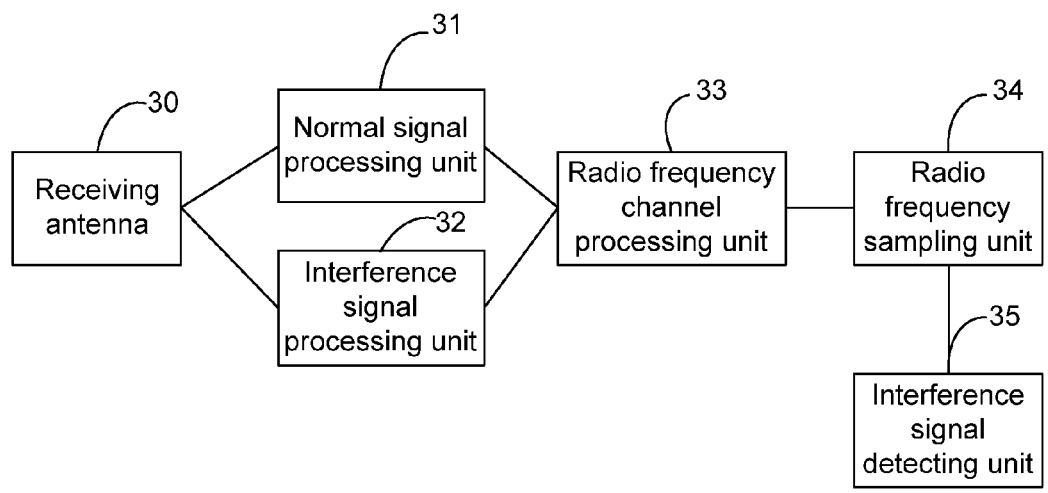
FIG. 3 is a schematic structural diagram of an apparatus for detecting spectrum interference according to an embodiment of the disclosure.

According to an embodiment of the disclosure, an apparatus for detecting spectrum interference is provided. FIG. 3 is a schematic structural diagram of an apparatus for detecting spectrum interference according to an embodiment of the disclosure. As illustrated in FIG. 3, the apparatus for detecting spectrum interference according to an embodiment of the disclosure includes: a receiving antenna 30, a normal signal processing unit 31, an interference signal processing unit 32, a radio frequency channel processing unit 33, a radio frequency sampling unit 34, and an interference signal detecting unit 35. Various modules according to the embodiment of the disclosure are described in detail hereinafter.

The receiving antenna 30 is configured to receive a spatial signal, wherein the spatial signal includes a normal signal and an interference signal.

Preferably, in the embodiment of the disclosure, the receiving antenna 30 may be a receiving antenna 30 of a base station connected to the normal signal processing unit 31 and the interference signal processing unit 32; or the receiving antenna 30 may include an auxiliary detecting antenna connected to the interference signal processing unit 32, and a receiving antenna 30 of a base station connected to the normal signal processing unit 31.

The normal signal processing unit 31 is configured to perform wave filtering and low-noise amplification for the normal signal received by the receiving antenna 30, and to send the processed normal signal to the radio frequency channel processing unit 33.

Preferably, the normal signal processing unit 31 may include:

a duplex filter, configured to perform duplex filtering for the normal signal; and a low-noise amplifier, configured to perform low-noise amplification for the normal signal performed the duplex filtering, and to send the normal signal performed the low-noise amplification to the radio frequency channel processing unit 33.

The interference signal processing unit 32 is configured to preprocess the interference signal received by the receiving antenna 30, and to send the processed interference signal to the radio frequency channel processing unit 33.

The interference signal processing unit 32 may include:

a broadband coupler, configured to perform coupling for the interference signal;

an envelope detector, configured to perform amplitude detection for the interference signal performed the coupling, and to acquire an amplitude of the interference signal;

a comparator, configured to compare the amplitude of the interference signal with a preset amplitude threshold; if the amplitude of the interference signal is greater than the preset amplitude threshold, to enable the interference signal to pass through an amplitude limiter by using a control switch; if the amplitude of the interference signal is less than the preset amplitude threshold, to enable the interference signal to directly flow into the radio frequency channel processing unit 33 by using the control switch; and the amplitude limiter, configured to perform amplitude limiting for the interference signal flowing into the radio frequency channel processing unit, and to send the interference signal performed the amplitude limiting to the radio frequency channel processing unit 33.

The radio frequency channel processing unit 33 is configured to perform radio frequency processing for the received normal signal, and to perform radio frequency processing for the preprocessed interference signal in an idle timeslot.

The radio frequency sampling unit 34 is configured to perform, according to an input sampling clock, radio frequency sampling for the normal signal performed the radio frequency processing, to perform radio frequency sampling for the interference signal performed the radio frequency processing in an idle timeslot, and to send the interference signal performed the radio frequency sampling to the interference signal detecting unit 35.

The interference signal detecting unit 35 is configured to perform fast Fourier transform in a digital domain for the interference signal performed the radio frequency sampling, to perform frequency band identification, and to acquire a communication mode of the interference signal.

The interference signal detecting unit 35 may include:

a frequency band identifying module, configured to perform fast Fourier transform in a digital domain for the interference signal performed the radio frequency sampling, and to perform frequency band identification according to a location and a bandwidth of the interference signal in a frequency domain; and a communication mode identifying module, configured to enable, after the frequency band identifying module performs the fast Fourier transform in the digital domain for the interference signal, the interference signal in a time domain to sequentially pass through digital filters in various communication modes, and to determine a communication mode of the interference signal according to information of a maximum amplitude in the digital filters in various communication modes.

Preferably, the interference signal detecting unit 35 may further include: a cell information identifying module, configured to demodulate the interference signal in a time domain to zero frequency, to use a peculiar fixed signal sequence in a communication mode signal corresponding to communication mode of the interference signal in a baseband, to perform related calculation with the interference signal, and to acquire related cell information of the interference signal.

The above technical solutions of the embodiments of the disclosure are described in detail with reference to the drawings.

Figure 4:
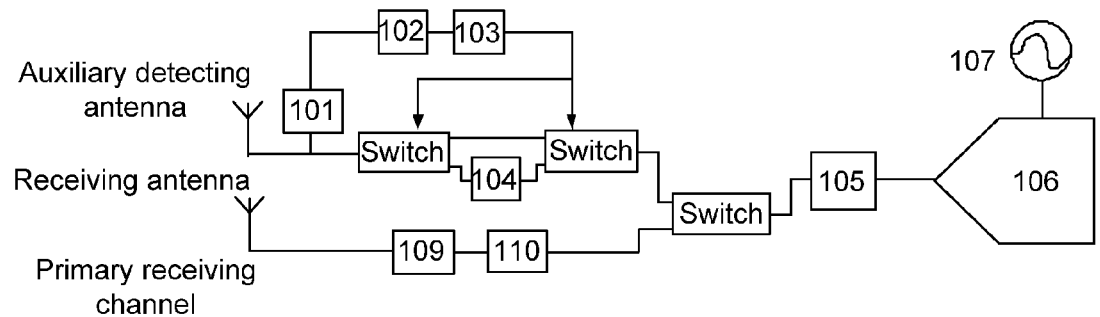
FIG. 4 is a schematic structural diagram of a first implementation of the apparatus for detecting spectrum interference according to an embodiment of the disclosure.
Figure 5:
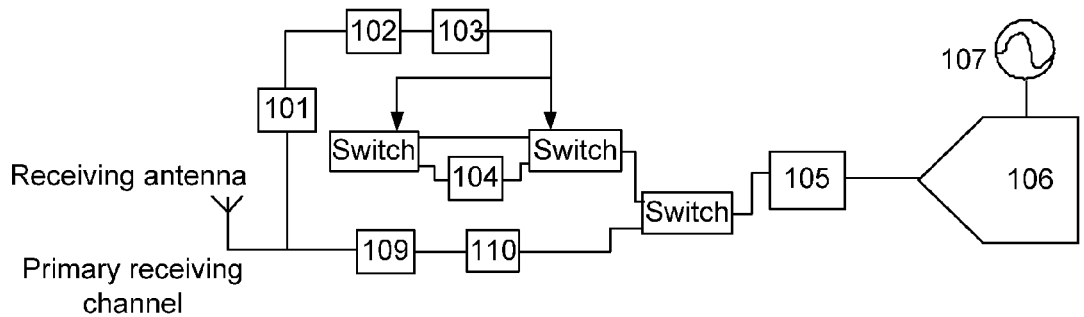
FIG. 5 is a schematic structural diagram of a second implementation of the apparatus for detecting spectrum interference according to an embodiment of the disclosure.

In the embodiment of the disclosure, the above apparatus for detecting spectrum interference may be implemented via two solutions. The first solution is as illustrated in FIG. 4, wherein an auxiliary detecting antenna is added, and the normal receiving channel of the base station is reused for completing the detection. The second solution is as illustrated in FIG. 5, the normal receiving antenna of the base station is directly used, and similarly the normal receiving channel of the base station is reused for completing the detection. It should be noted that an auxiliary detecting antenna is added into the apparatus as illustrated in FIG. 4, and the receiving antenna of the base station is used in the apparatus as illustrated in FIG. 5. These two implementation solutions differ from each other only in the receiving antenna, and the subsequent processing of the interference signal is the same.

The processing procedure of the apparatus for detecting spectrum interference as illustrated in FIG. 4 is as follows: to avoid influencing the sensitivity of the normal receiving channel of the base station, an auxiliary detecting antenna is used to directly preprocess the wireless interference signal without a duplexer 109 and a low-noise amplifier 110, and then the preprocessed interference signal selectively enters the normal receiving channel of the base station via a switch. The preprocessing the wireless interference signal includes the following steps: the interference signal firstly passes through a broadband coupler 101, passes through an envelope detector 102, and then passes through a comparator 103. Subsequently, the interference signal is controlled via an output control signal as whether to pass through an amplitude limiter 104 or directly pass away. After entering a receiving channel of a transceiver board via a switch, the interference signal passes through a radio frequency channel processing unit 105 on the receiving channel, and enters a radio frequency sampling ADC 106. The radio frequency sampling ADC 106 performs radio frequency sampling according to a sampling clock sent by a clock apparatus 107. The radio frequency sampling ADC 106 may employ practical sampling, or re-sampling. It should be noted that if re-sampling is employed, the signal entering the radio frequency sampling ADC must be an I/Q quadrature signal.

The processing procedure of the apparatus for detecting spectrum interference as illustrated in FIG. 5 is as follows: the receiving antenna of the base station is directly used, and the received wireless interference signal is preprocessed. The preprocessing step includes: the interference signal firstly passes through the broadband coupler 101, and then passes through the envelope detector 102. Subsequently, the interference signal is controlled via an output control signal as whether to pass through the amplitude limiter 104 or directly pass away. After entering a receiving channel of a transceiver board via a switch, the interference signal passes through the radio frequency channel processing unit 105 on the receiving channel, and enters the radio frequency sampling ADC 106. The radio frequency sampling ADC 106 performs radio frequency sampling according to a sampling clock sent by the clock apparatus 107. The radio frequency sampling ADC 106 may employ practical sampling, or re-sampling. It should be noted that if re-sampling is employed, the signal entering the radio frequency sampling ADC must be an I/Q quadrature signal.

Figure 6:
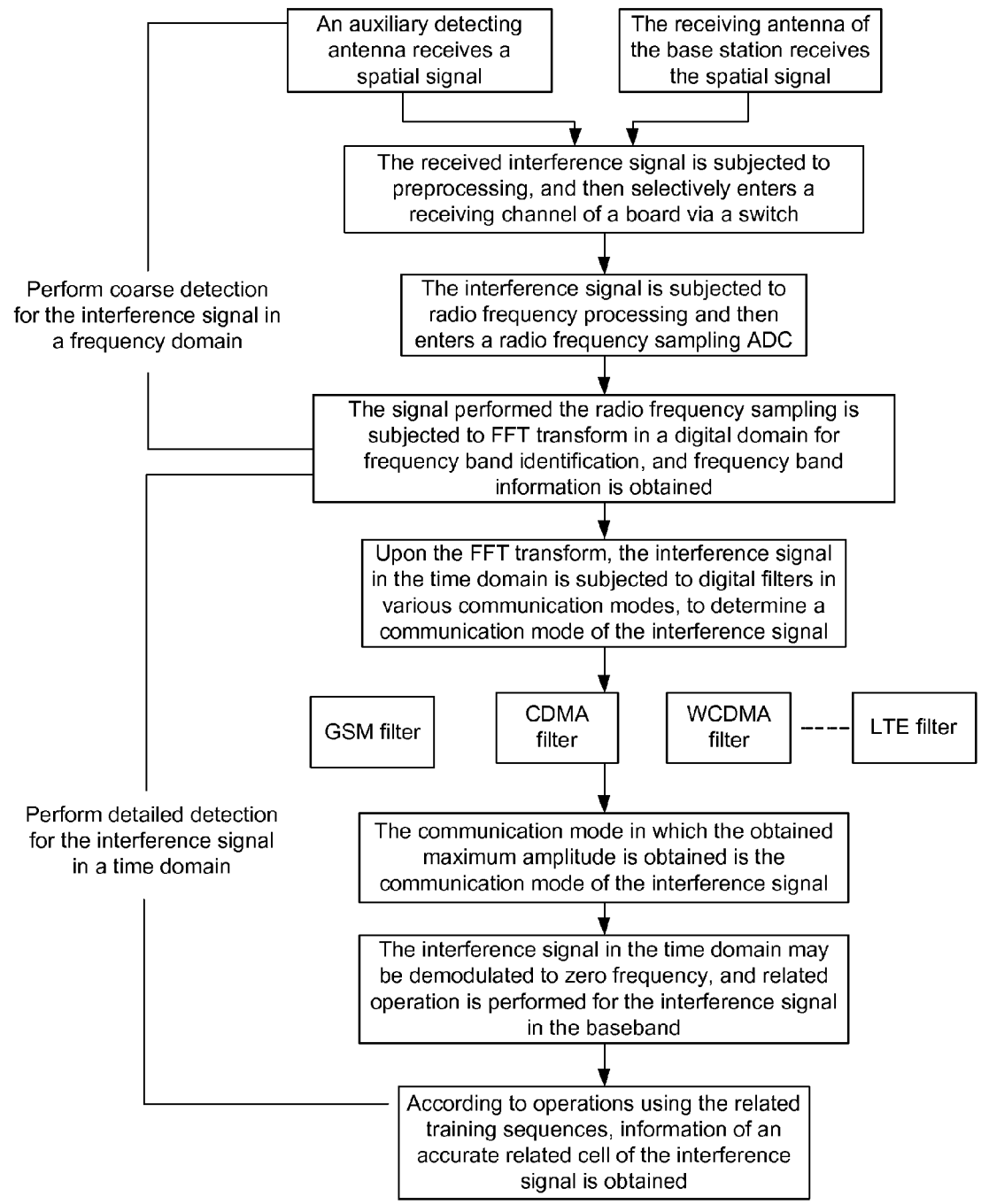
FIG. 6 is a flowchart of analyzing and detection of radio spectrum interference according to an embodiment of the disclosure.

FIG. 6 is a flowchart of analyzing and detection of radio spectrum interference according to an embodiment of the disclosure. As illustrated in FIG. 6, after the radio frequency sampling ADC 106 in the apparatus for detecting spectrum interference as illustrated in FIG. 4 and FIG. 5 performs radio frequency sampling, the interference signal detecting unit (not illustrated in FIG. 4 or FIG. 5) may perform detailed detection for the interference signal performed the radio frequency sampling in the time domain. The specific processing is as follows:

The signal performed the radio frequency sampling directly enters a digital domain for FFT transform and thus a frequency band thereof is identified. The signal frequency band is identified according to a location and a bandwidth of the signal in a frequency domain. At present, the sampling rate may reach 3.6 GHz; in addition, re-sampling is employed, and the frequency domain bandwidth may cover signals in all the communication modes with a current communication frequency of 3.5 GHz. If practical sampling is employed, it is required that the sampling rate may be variable according to the actual needs. Such requirement is directed to observing frequency changes of the signals falling within the Nyquist-domain frequency band by means of changing the sampling frequency, and to determining the practical frequency and amplitude information of the signal.

After the frequency band of the signal is determined, signal modes are preliminarily categorized according to a conventional internationally-stipulated spectrum resource list. The spectrum signals in the conventional communications field cover GSM, CDMA, WCDMA, TDSCDMA, WLAN, Bluetooth, LTE, and the like. Within the coverage of signals in such communication modes, the frequency bands thereof may overlap or may be adjacent. A further determination method is to subject the interference signals to digital filters in various communication modes in a time domain, wherein the communication mode in which the obtained maximum amplitude is obtained is the communication mode of the interference signal.

For example, the frequency of the interference signal determined via FFT is around 800 MHz, and the signal in this frequency may be a GSM850M signal or a CDMA signal. A further determination method is to simultaneously subject the interference signal to digital filters in the CDMA and GSM850M modes in the time domain, wherein the communication mode in which the obtained maximum amplitude is obtained is the communication mode of the interference signal.

To further acquire specific information such as the cell of the interference signal, the interference signal in the time domain may be demodulated to zero frequency, and related operation is performed for the interference signal in the baseband. To be specific, with respect to the interference signal in a specific communication mode, the related operation is performed for the received signal by using a peculiar fixed signal sequence in the signal in the communication mode, to obtain a maximum related peak value.

For example, in GSM, there are eight groups of fixed training sequences, CDMA200 employs variable WALSH code; WCDMA employs complex scrambling code to distinguish the base station from the user, wherein the complex scrambling code is formed of a GOLD sequence, and a forward scrambling code may be selectively a long scrambling code or short scrambling code; LTE employs a ZC sequence; and TDSCDMA employs an MIDAMBLE training sequence.

Through operations using the related training sequences, information of an accurate related cell of the interference signal is obtained.

In conclusion, the apparatus for detecting spectrum interference according to the embodiment of the disclosure may reuse the receiving channel of a normal base station. In addition, the receiving channel of a wireless broadband base station employs radio frequency sampling, which is thus capable of detecting a wide range of interference signals. However, the traditional detection method is only capable of detecting the interference signals within a receiving frequency band or a portion of the interference signals within the receiving frequency band. With the technical solutions according to the embodiments of the disclosure, all the surrounding unknown wireless interference signals may be received for detection and analyzing.

Method Embodiment

Figure 7:
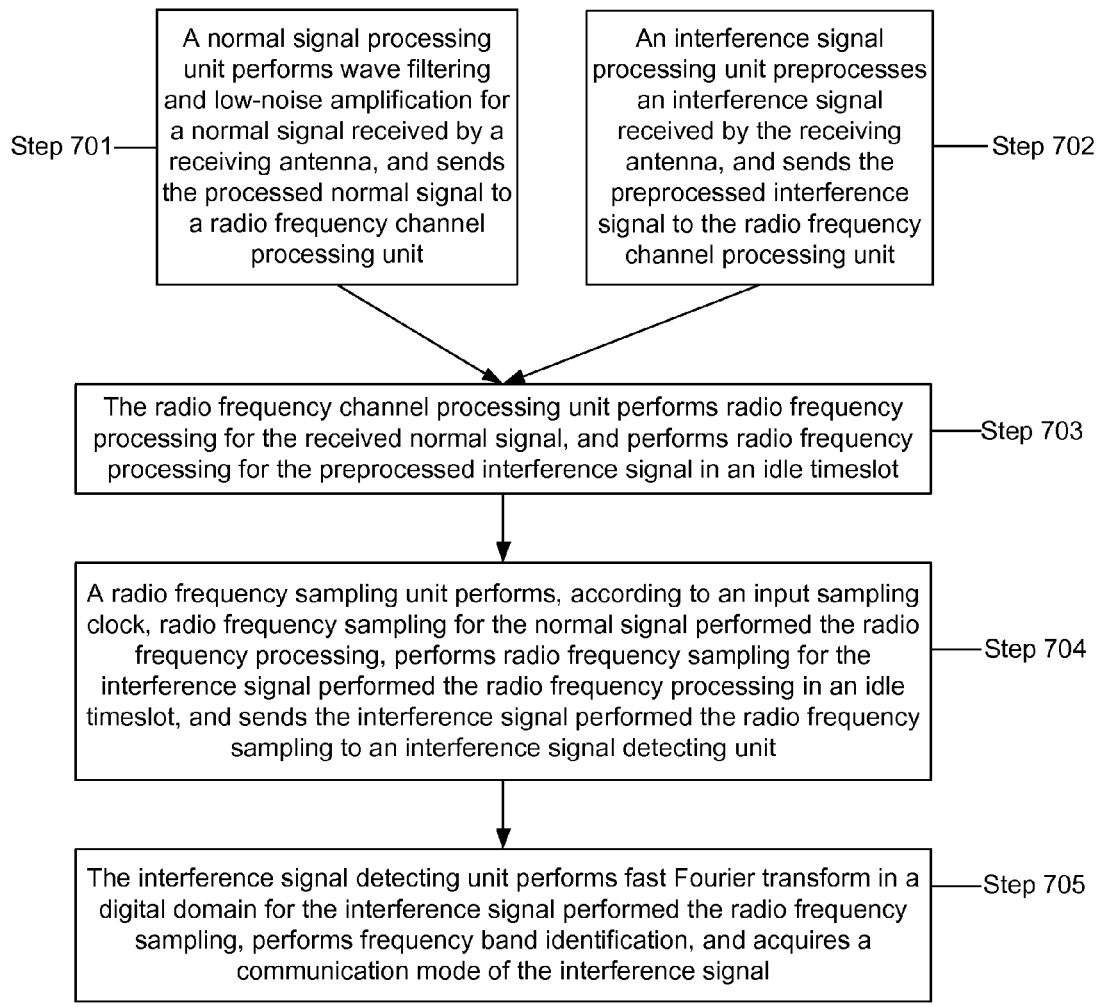
FIG. 7 is a flowchart of a method for detecting spectrum interference according to an embodiment of the disclosure.

According to an embodiment of the disclosure, a method for detecting spectrum interference is provided for use in the apparatus for detecting spectrum interference according to the above apparatus embodiment. FIG. 7 is a flowchart of a method for detecting spectrum interference according to an embodiment of the disclosure. As illustrated in FIG. 7, the method for detecting spectrum interference according to the embodiment of the disclosure includes the following steps.

Step 701: a normal signal processing unit performs wave filtering and low-noise amplification for a normal signal received by a receiving antenna, and sends the processed normal signal to a radio frequency channel processing unit.

Preferably, corresponding to the apparatus embodiment, the receiving antenna may be a receiving antenna of a base station connected to the normal signal processing unit and the interference signal processing unit; or the receiving antenna may include an auxiliary detecting antenna connected to the interference signal processing unit, and a receiving antenna of a base station connected to the normal signal processing unit.

Step 701 may specifically include: performing duplex filtering, by a duplex filter in the normal signal processing unit, for the normal signal; and performing, by a low-noise amplifier in the normal signal processing unit, low-noise amplification for the normal signal performed the duplex filtering, and sending the normal signal performed the low-noise amplification to the radio frequency channel processing unit.

Step 702: an interference signal processing unit preprocesses an interference signal of a spatial signal received by the receiving antenna, and sends the processed interference signal to the radio frequency channel processing unit.

Step 702 may specifically include:

performing, by a broadband coupler in the interference signal processing unit, coupling for the interference signal; performing, by an envelope detector in the interference signal processing unit, detection for the interference signal performed the coupling, and acquiring an amplitude of the interference signal; comparing, by a comparator in the interference signal processing unit, the amplitude of the interference signal with a preset amplitude threshold; if the amplitude of the interference signals is greater than the preset amplitude threshold, enabling the interference signal to pass through a limiter by using a control switch; if the amplitude of the interference signals is less than the preset amplitude threshold, enabling the interference signal to directly flow into the radio frequency channel processing unit by using the control switch; and performing, by a limiter in the interference signal processing unit, amplitude limiting for the interference signal flowing into the radio frequency channel processing unit, and sending the interference signals performed the amplitude limiting to the radio frequency channel processing unit.

Step 703: the radio frequency channel processing unit performs radio frequency processing for the received normal signal, and performs radio frequency processing for the preprocessed interference signal in an idle timeslot.

Step 704: a radio frequency sampling unit performs, according to an input sampling clock, radio frequency sampling for the normal signal performed the radio frequency processing, performs radio frequency sampling for the interference signal performed the radio frequency processing in an idle timeslot, and sends the interference signal performed the radio frequency sampling to an interference signal detecting unit.

Step 704: the interference signal detecting unit performs fast Fourier transform in a digital domain for the interference signal performed the radio frequency sampling, performs frequency band identification, and acquires a communication mode of the interference signal.

Step 705 may specifically include: performing, by a frequency band identifying module in the interference signal detecting unit, fast Fourier transform in a digital domain for the interference signal performed the radio frequency sampling, performing frequency band identification according to a location and a bandwidth of the interference signal in a frequency domain; and enabling, by a communication mode identifying module in the interference signal detecting unit, after the frequency band identifying module performs the fast Fourier transform in the digital domain for the interference signal, the interference signal in a time domain to sequentially pass through digital filters in various communication modes, and determining a communication mode of the interference signal according to information of a maximum amplitude of the digital filters in various communication modes.

Preferably, after step 705, the method according to the embodiment of the disclosure may further include: demodulating, by a cell information identifying module in the interference signal detecting unit, the interference signal in a time domain to zero frequency, using a peculiar fixed signal sequence in a standard signal corresponding to the communication mode of the interference signal in a baseband, performing related calculation with the interference signal, and acquiring related cell information of the interference signal.

The above technical solutions of the embodiments of the disclosure are described in detail with reference to the drawings.

In the apparatus embodiment, the structure of the apparatus for detecting spectrum interference is described in detail, which is thus not described herein any further. Herein, only the method for detecting spectrum interference is described in detail.

As illustrated in FIG. 6, the processing procedure of analyzing and detection of radio spectrum interference according to an embodiment of the disclosure is as follows.

Step 1: in the apparatus for detecting spectrum interference as illustrated in FIG. 4, an interference signal enters an interference signal preprocessing unit through a detecting antenna; and in the apparatus for detecting spectrum interference as illustrated in FIG. 5, the interference signal enters the interference signal preprocessing unit through a receiving antenna of a base station. The preprocessing the interference signal includes the following steps: the interference signal firstly passes through a broadband coupler 101, passes through an envelope detector 102, and then passes through a comparator 103. Subsequently, the interference signal is controlled via an output control signal as whether to pass through an amplitude limiter 104 or directly pass away.

It should be noted that the wireless interference signal may be detected in a protection timeslot between transmission and reception of a primary base station. (During receiving of the interference signal, the base station cannot transmit a signal in case that too great signal power is caused and thus collection of the interference signals is affected).

Step 2: the interference signal enters a receiving channel of a transceiver board through a switch, passes through a radio frequency channel processing unit 105 on the receiving channel, and then enters a radio frequency sampling ADC 106 for radio frequency sampling.

Step 3: the signal performed the radio frequency sampling directly enters a digital domain for FFT transform and thus a frequency band thereof is identified. The signal frequency band is identified according to a location and a bandwidth of the signal in a frequency domain. At present, the sampling rate may reach 3.6 GHz; in addition, re-sampling is employed, and the frequency domain bandwidth may cover signals in all the communication modes with a current communication frequency of 3.5 GHz. If practical sampling is employed, it is required that the sampling rate may be variable according to the actual needs. Such requirement is directed to observing frequency changes of the signals falling within the Nyquist-domain frequency band by means of changing the sampling frequency, and to determining the practical frequency and amplitude information of the signal.

Step 4: after the frequency band of the signal is determined, signal modes are preliminarily categorized according to a conventional internationally-stipulated spectrum resource list. The spectrum signals in the conventional communications field cover GSM, CDMA, WCDMA, TDSCDMA, WLAN, Bluetooth, LTE, and the like. Within the coverage of signals in such communication modes, the frequency bands thereof may overlap or may be adjacent. A further determination method is to subject the interference signal to digital filters in various communication modes in a time domain, wherein the communication mode in which the obtained maximum amplitude is obtained is the communication mode of the interference signal.

For example, the frequency of the interference signal determined via FFT is around 800 MHz, and the signal in this frequency may be a GSM850M signal or a CDMA signal. A further determination method is to simultaneously subject the interference signal to digital filters in the CDMA and GSM850M modes in the time domain, wherein the communication mode in which the obtained maximum amplitude is obtained is the communication mode of the interference signal.

Step 5: to further acquire specific information such as the cell of the interference signal, the interference signal in the time domain may be demodulated to zero frequency, and related operation is performed for the interference signal in the baseband. To be specific, with respect to the interference signal in a specific communication mode, the related operation is performed for the received signal by using a peculiar fixed signal sequence in the signal in the communication mode, to obtain a maximum related peak value.

For example, in GSM, there are eight groups of fixed training sequences, CDMA200 employs variable WALSH code; WCDMA employs complex scrambling code to distinguish the base station from the user, wherein the complex scrambling code is formed of a GOLD sequence, and a forward scrambling code may be selectively a long scrambling code or short scrambling code; LTE employs a ZC sequence; and TDSCDMA employs an MIDAMBLE training sequence.

Step 6: through operations using the related training sequences, information of an accurate related cell of the interference signal is obtained.

In conclusion, with the technical solutions according to the embodiments of the disclosure, the detecting apparatus designed by using the detecting antenna or the receiving antenna of the base station and by reusing the existing receiving channel is capable of simultaneously receiving more unknown wireless interference signals for analyzing and processing. This does not influence normal operation of receiving and sending information of the base station, and saves the cost. In addition, with the technical solutions according to the embodiments of the disclosure, such information as the frequency, amplitude, communication mode, and cell of the interference signals may be detected, such that the wireless broadband base station better implementing work such as frequency planning.

The algorithm and the display provided herein are not related to any specific computer, virtual system or other devices. Various general systems may also be used in conjunction with the teachings given herein. According to the above description, the structure desired for forming such system is obvious. Furthermore, the disclosure is not directed against any particular programming language. It should be appreciated that a variety of programming languages may be used to realize the content of the disclosure described herein, and the above description made to the disclosure of the specific language is intended to disclose a preferred embodiment of the disclosure.

In the description provided herein, a greater number of specific details are given. However, it is understood that the embodiments of the disclosure may still be practiced without these specific details. In some examples, the commonly known methods, structures and technologies are not specifically illustrated, so as not to obscure the understanding of the specification.

Similarly, it should be understood that, in order to streamline the disclosure and facilitate understanding of one or more of various aspects of the disclosure, in the above description of exemplary embodiments of the disclosure, various features of the disclosure are sometimes grouped together into a single embodiment, drawing, or description thereof. However, the method disclosed should not be interpreted as reflecting an intention as follows: i.e., the disclosure to be protected requires more features than the features disclosed clearly in each of the claims. More specifically, as reflected in the appended claims, the inventiveness lies in that the features of the disclosure are fewer than all the features contained in a single embodiment previously disclosed. Thus, the claims in accordance with the detailed description of the disclosure are hereby expressly incorporated into the detailed description, wherein each claim itself functions as an independent embodiment of the disclosure.

Those skilled in the art may appreciate that modules in the devices according to an embodiment may be subjected to adaptive modifications and the modules may be configured in one or more devices that are different from that or those in this embodiment. Modules or units or components in the embodiments may be combined into one module or unit or component, and in addition such module or unit or component may also be partitioned into a plurality of submodules or subunits or subcomponents. At least some of such features and/or processes or units are mutually exclusive. Apart from such exclusions, any combination may be employed for all the features disclosed in the specification (including the appended claims, abstract, and drawings) of the disclosure, and all the processes or units in any method or device such disclosed. Unless otherwise clearly specified, each feature in the specification (including the appended claims, abstract, and drawings) of the disclosure may be provided by an alternative feature having the same, equivalent or similar purpose.

Moreover, a person skilled in the art shall appreciate that although some embodiments described herein include certain features of other embodiments rather than other features, combinations of the features in different embodiments fall within the scope of the disclosure and tend to constitute different embodiments. For example, in the appended claims, any of the claimed embodiments may be subjected to any one of the combinations.

The various modules and members according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to implement some or all of the functions of some or all of the members of the spectrum interference detection apparatus according to the embodiments of the disclosure. The disclosure may further be implemented as devices or apparatus programs (for example, computer programs and computer program products) for executing some or all of the methods as described herein. The programs for implementing the disclosure may be stored in the computer readable medium, or have a form of one or more signals. Such a signal may be downloaded from the Internet websites, or be provided in carrier, or be provided in other manners.

It should be noticed that the above-described embodiments are intended to illustrate but not to limit the disclosure, and alternative embodiments can be devised by the person skilled in the art without departing from the scope of claims as appended. In the claims, any reference symbols between brackets should not form a limit of the claims. The wording "including" or "comprising" does not exclude the presence of elements or steps not listed in a claim. The wording "a" or "an" in front of an element does not exclude the presence of a plurality of such elements. The disclosure may be achieved by means of hardware including a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

INDUSTRIAL APPLICABILITY

The disclosure provides an apparatus and a method for detecting spectrum interference. The apparatus includes: a receiving antenna, configured to receive a spatial signal; a normal signal processing unit, configured to perform wave filtering and low-noise amplification for the normal signal received by the receiving antenna, and to send the processed normal signal to a radio frequency channel processing unit; an interference signal processing unit, configured to preprocess the interference signal received by the receiving antenna, and to send the preprocessed interference signal to the radio frequency channel processing unit; the radio frequency channel processing unit, configured to perform radio frequency processing for the received normal signal, and to perform radio frequency processing for the preprocessed interference signal in an idle timeslot; a radio frequency sampling unit, configured to perform, according to an input sampling clock, radio frequency sampling for the normal signal performed the radio frequency processing, to perform radio frequency sampling for the interference signal performed the radio frequency processing in an idle timeslot, and to send the interference signal performed the radio frequency sampling to an interference signal detecting unit; and the interference signal detecting unit, configured to perform fast Fourier transform in a digital domain for the interference signal performed the radio frequency sampling, to perform frequency band identification, and to acquire a communication mode of the interference signal. The disclosure is capable of solving the problem that unknown interference signals around a wireless broadband base station fail to be detected in the related art.

What is claimed is:

1. An apparatus for detecting spectrum interference, comprising:
    a receiving antenna, configured to receive a spatial signal, wherein the spatial signal comprises a normal signal and an interference signal;
    a normal signal processing unit, configured to perform wave filtering and low-noise amplification for the normal signal received by the receiving antenna, and to send the processed normal signal to a radio frequency channel processing unit;
    an interference signal processing unit, configured to preprocess the interference signal received by the receiving antenna, and to send the preprocessed interference signal to the radio frequency channel processing unit;
    the radio frequency channel processing unit, configured to perform radio frequency processing for the received normal signal, and to perform radio frequency processing for the preprocessed interference signal in an idle timeslot;
    a radio frequency sampling unit, configured to perform, according to an input sampling clock, radio frequency sampling for the normal signal performed the radio frequency processing, to perform radio frequency sampling for the interference signal performed the radio frequency processing in an idle timeslot, and to send the interference signal performed the radio frequency sampling to an interference signal detecting unit; and
    the interference signal detecting unit, configured to perform fast Fourier transform in a digital domain for the interference signal performed the radio frequency sampling, to perform frequency band identification, and to acquire a communication mode of the interference signal.

2. The apparatus according to claim 1, wherein the receiving antenna is a receiving antenna of a base station connected to the normal signal processing unit and the interference signal processing unit; or
    the receiving antenna comprises an auxiliary detecting antenna connected to the interference signal processing unit, and a receiving antenna of a base station connected to the normal signal processing unit.

3. The apparatus according to claim 2, wherein the normal signal processing unit comprises:
a duplex filter, configured to perform duplex filtering for the normal signal; and
a low-noise amplifier, configured to perform low-noise amplification for the normal signal performed the duplex filtering, and to send the normal signal performed the low-noise amplification to the radio frequency channel processing unit.

4. The apparatus according to claim 2, wherein the interference signal processing unit comprises:
a broadband coupler, configured to perform power coupling for the interference signal;
an envelope detector, configured to perform amplitude detection for the interference signal performed the coupling, and to acquire an amplitude of the interference signal;
a comparator, configured to: compare the amplitude of the interference signal with a preset amplitude threshold; if the amplitude of the interference signal is greater than the preset amplitude threshold, to enable the interference signal to pass through an amplitude limiter by using a control switch; and if the amplitude of the interference signal is less than the preset amplitude threshold, to enable the interference signal to directly flow into the radio frequency channel processing unit by using the control switch; and
the amplitude limiter, configured to perform amplitude limiting for the interference signal flowing into the radio frequency channel processing unit, and to send the interference signal performed the amplitude limiting to the radio frequency channel processing unit.

5. The apparatus according to claim 2, wherein the interference signal detecting unit comprises:
a frequency band identifying module, configured to perform fast Fourier transform in a digital domain for the interference signal performed the radio frequency sampling, and to perform frequency band identification according to a location and a bandwidth of the interference signal in a frequency domain; and
a communication mode identifying module, configured to enable, after the frequency band identifying module performs the fast Fourier transform in the digital domain for the interference signal, the interference signal in a time domain to sequentially pass through digital filters in various communication modes, and to determine a communication mode of the interference signal according to information of a maximum amplitude in the digital filters in various communication modes.

6. The apparatus according to claim 5, wherein the interference signal detecting unit further comprises:
a cell information identifying module, configured to demodulate the interference signal in a time domain to zero frequency, to use a fixed signal sequence in a mode signal corresponding to communication mode of the interference signal in a baseband, to perform related calculation with the interference signal, and to acquire related cell information of the interference signal.

7. A method for detecting spectrum interference, comprising:
performing, by a normal signal processing unit, wave filtering and low-noise amplification for a normal signal received by a receiving antenna, and sending the processed normal signal to a radio frequency channel processing unit;
preprocessing, by an interference signal processing unit, an interference signal received by the receiving antenna, and sending the processed interference signal to the radio frequency channel processing unit;
performing, by the radio frequency channel processing unit, radio frequency processing for the received normal signal, and performing radio frequency processing for the preprocessed interference signal in an idle timeslot;
performing, by a radio frequency sampling unit according to an input sampling clock, radio frequency sampling for the normal signal performed the radio frequency processing, performing radio frequency sampling for the interference signal performed the radio frequency processing in an idle timeslot, and sending the interference signal performed the radio frequency sampling to an interference signal detecting unit; and
performing, by the interference signal detecting unit, fast Fourier transform in a digital domain for the interference signal performed the radio frequency sampling, performing frequency band identification, and acquiring a communication mode of the interference signal.

8. The method according to claim 7, wherein the receiving antenna is a receiving antenna of a base station connected to the normal signal processing unit and the interference signal processing unit; or
the receiving antenna comprises an auxiliary detecting antenna connected to the interference signal processing unit, and a receiving antenna of a base station connected to the normal signal processing unit.

9. The method according to claim 8, wherein the performing, by a normal signal processing unit, wave filtering and low-noise amplification for a normal signal received by a receiving antenna, and sending the processed normal signal to a radio frequency channel processing unit comprises:
performing duplex filtering, by a duplex filter in the normal signal processing unit, for the normal signal; and
performing, by a low-noise amplifier in the normal signal processing unit, low-noise amplification for the normal signal performed the duplex filtering, and sending the normal signal performed the low-noise amplification to the radio frequency channel processing unit.

10. The method according to claim 8, wherein the preprocessing, by an interference signal processing unit, an interference signal received by the receiving antenna, and sending the processed interference signal to the radio frequency channel processing unit comprises:
performing, by a broadband coupler in the interference signal processing unit, coupling for the interference signal;
performing, by an envelope detector in the interference signal processing unit, detection for the interference signal performed the coupling, and acquiring an amplitude of the interference signal;
comparing, by a comparator in the interference signal processing unit, the amplitude of the interference signal with a preset amplitude threshold; if the amplitude of the interference signals is greater than the preset amplitude threshold, enabling the interference signal to pass through an amplitude limiter by using a control switch; and if the amplitude of the interference signals is less than the preset amplitude threshold, enabling the interference signal to directly flow into the radio frequency channel processing unit by using the control switch; and
performing, by the amplitude limiter in the interference signal processing unit, amplitude limiting for the interference signal flowing into the radio frequency channel processing unit, and sending the interference signals performed the amplitude limiting to the radio frequency channel processing unit.

11. The method according to claim 8, wherein the performing, by the interference signal detecting unit, fast Fourier transform in a digital domain for the interference signal performed the radio frequency sampling, perform frequency band identification, and acquiring a communication mode of the interference signal comprises:

performing, by a frequency band identifying module in the interference signal detecting unit, fast Fourier transform in a digital domain for the interference signal performed the radio frequency sampling, performing frequency band identification according to a location and a bandwidth of the interference signal in a frequency domain; and enabling, by a communication mode identifying module in the interference signal detecting unit, after the frequency band identifying module performs the fast Fourier transform in the digital domain for the interference signal, the interference signal in a time domain to sequentially pass through digital filters in various communication modes, and determining a communication mode of the interference signal according to information of a maximum amplitude of the digital filters in various communication modes.

12. The method according to claim 11, further comprising: demodulating, by a cell information identifying module in the interference signal detecting unit, the interference signal in a time domain to zero frequency, using a fixed signal sequence in a mode signal corresponding to the communication mode of the interference signal in a baseband, performing related calculation with the interference signal, and acquiring related cell information of the interference signal.

* * * * *